United States Patent
Megiddo et al.

(10) Patent No.: US 6,947,557 B1
(45) Date of Patent: Sep. 20, 2005

(54) METHOD AND PROGRAM PRODUCT FOR MAINTAINING SECURITY OF PUBLICLY DISTRIBUTED INFORMATION

(75) Inventors: Nimrod Megiddo, Palo Alto, CA (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 09/638,661

(22) Filed: Aug. 14, 2000

(51) Int. Cl.$^7$ .............................................. H04L 9/00
(52) U.S. Cl. ...................................................... 380/30
(58) Field of Search .......... 380/30; 713/200–202; 709/225–229; 705/64

(56) References Cited

U.S. PATENT DOCUMENTS

| | | | |
|---|---|---|---|
| 5,193,115 A * | 3/1993 | Vobach .......................... | 380/46 |
| 5,892,900 A | 4/1999 | Ginter et al. ................ | 395/186 |
| 5,930,808 A | 7/1999 | Yamanaka et al. ........... | 707/501 |
| 6,029,141 A | 2/2000 | Bezos et al. ................... | 705/27 |
| 6,029,195 A | 2/2000 | Herz ............................ | 709/219 |
| 6,041,357 A | 3/2000 | Kunzelman et al. ......... | 709/228 |
| 6,105,012 A * | 8/2000 | Chang et al. .................. | 705/64 |
| 6,351,536 B1 * | 2/2002 | Sasaki .......................... | 380/44 |
| 6,453,353 B1 * | 9/2002 | Win et al. .................... | 709/229 |

* cited by examiner

Primary Examiner—Andrew Caldwell
Assistant Examiner—Minh Dieu Nguyen
(74) Attorney, Agent, or Firm—Charles W. Peterson, Jr.; Marc D. McSwain

(57) ABSTRACT

A method and computer program product for selectively making information available to groups of parties amongst a plurality of parties. Public keys that may be descriptive, such as a simple name or part of a name, are generated and published. Random suffixes or keys, which are random both in nature and in appearance, are generated, combined with public keys and distributed to members of groups selected to have access to secure data identified by a particular secure key. The random suffixes may be combined with the public keys to form a URL that appears to be simultaneously random and descriptive. Secure keys may be changed periodically, replacing the random suffix portion with a newly generated random suffix. Secure keys may be encryption keys derived from randomly generated decryption keys.

25 Claims, 4 Drawing Sheets

| | | |
|---|---|---|
| 0: 0 | A: 10 | a: 36 |
| 1: 1 | B: 11 | b: 37 |
| 2: 2 | C: 12 | c: 38 |
| 3: 3 | D: 13 | d: 39 |
| 4: 4 | E: 14 | e: 40 |
| 5: 5 | F: 15 | f: 41 |
| 6: 6 | G: 16 | g: 42 |
| 7: 7 | H: 17 | h: 43 |
| 8: 8 | I: 18 | i: 44 |
| 9: 9 | J: 19 | j: 45 |
| | K: 20 | k: 46 |
| | L: 21 | l: 47 |
| | M: 22 | m: 48 |
| | N: 23 | n: 49 |
| | O: 24 | o: 50 |
| | P: 25 | p: 51 |
| | Q: 26 | q: 52 |
| | R: 27 | r: 53 |
| | S: 28 | s: 54 |
| | T: 29 | t: 55 |
| | U: 30 | u: 56 |
| | V: 31 | v: 57 |
| | W: 32 | w: 58 |
| | X: 33 | x: 59 |
| | Y: 34 | y: 60 |
| | Z: 35 | z: 61 |

Fig. 4B

METHOD AND PROGRAM PRODUCT FOR MAINTAINING SECURITY OF PUBLICLY DISTRIBUTED INFORMATION

BACKGROUND OF THE INVENTION

1. Field of the Invention

The present invention generally relates to data file security and more particularly, the present invention relates to maintaining data security amongst shared data files such that files are shared only with remotely connected group members intended to be authorized to access the files.

2. Background Description

Generally what is known as the Internet or World Wide Web (WWW) is a large scale network of globally connected computers. The Internet places an almost limitless amount of information at the fingertips of each connected computer user. The information is located at various globally connected computers, each at what is typically referred to as a "Web Site." Each web site may include multiple accessible web pages linked to each other. Each web page is a data file encoded in HyperText Markup Language (HTML) or a similar browser friendly code. A web page may include one or more Hypertext links or Hyperlinks, each to a Uniform Resource Locator (URL) that points to a file at an Internet location. The file may be any type of file including but not limited to another HTML document or web page, a word processing document, compressed or uncompressed data or simple text. To take advantage of available information, what are known as web search engines have been developed and used in what is commonly referred to as "crawling" to find and index web pages, and respond to user queries based on the indexed web pages.

Collaborative efforts or projects, wherein multiple parties participate toward a common goal, often require participants to share information, work results, files, etc. These parties may be located at remote locations and sharing their work through a central server. The stored material may be made available to participants as users of a group by providing group access to the material, such as by placing links to the material on a particular website or the workgroup's homepage. This work may be very sensitive, requiring security measures, e.g., password protection, to guard from having it fall into the hands of a competitor. By limiting password distribution to those having a need to know within the workgroup, direct access to files may be restricted to the members of the workgroup.

However, web pages may be accessible, randomly, through a search engine or, deliberately, to anybody with knowledge of the particular URL. Further, a web site with links to other sites, makes those other sites available to any visitors to the original site. Thus, sensitive material stored with a link on a private web site may be accessible through an indiscretely placed copy of that link on a public web site. Often, web page owners post links to some material that is intended for the general public, as well as private material that may not be intended for the general public, but for a restricted audience, e.g., a workgroup.

For example, a scholar may wish to post published scientific writings for access by any web viewer, while making yet unpublished articles available only to a select few editors or reviewers. The same scholar may wish to affect a limited distribution of some political writings to those belonging to a certain political group and distribute personal material, e.g., family pictures and links, to a circle of relatives and friends. One approach to directing access is to collect related links onto different secure web sites, one web site for each work group. Small business and organizations that cannot afford to maintain what is typically referred to as an intranet may wish to maintain web pages intended only for their members or employees. See, for example, www.intranets.com.

However, usually it is impractical to set up registration and passwords for members of such groups. Also, there is still a security concern with entities like www.intranets.com, concerning the storage location of the sensitive information, i.e., whether it is stored on a private server rather than on some service provider's machine with additional storage charges.

Hackers are a well known problem, continuously assaulting web pages, servers and other internet connected computers, looking for a way to invade a target site. Once a hacker gains access to a site, the site may be unprotected, especially if the hacker can determine which files are available at the site, e.g., by accessing the directory listing. Typically, Hyper Text Transfer Protocol (HTTP) allows web servers to block directory listings. However, while blocking directory listings may offer some protection to the contents of the files stored in that directory, it also is more difficult for someone with legitimate access to the site to determine what is stored there.

Accordingly, there is a need for secure methods of selectively making information available to those remotely connected group members that are authorized to have access to the information without inadvertently allowing unauthorized access.

SUMMARY OF THE INVENTION

It is therefore a purpose of the present invention to make secure information available to group members;

It is another purpose of the invention to provide group members with access to secure information without exposing the secure information to access by unauthorized parties;

It is yet another purpose of the invention to restrict awareness of the availability of sensitive information such that parties not intended to have access to the existence of the sensitive information are unaware of it availability.

The present invention is a method and computer program product for selectively making information available to groups of parties amongst a plurality of parties. Public keys are generated and published. Secure keys, which are random both in nature and in appearance, are generated, combined with public keys and distributed to members of groups selected to have access to secure data identified by a particular secure key, i.e., a public key and secure key combination. The secure keys may be combined with the public keys to form a URL that appears to be simultaneously random and descriptive. Secure names or URLs may be changed periodically, replacing the secure key portion with a newly generated decryption key. In one embodiment, the secure key is an encryption key generated from a randomly generated decryption key. The encryption key is used to encrypt a web page, web page contents or URLs. The present invention may assist web page authors and designers in setting up secure file names and creating secure HTML files or secure hyperlinks and managing access permissions to material secured therein.

BRIEF DESCRIPTION OF THE DRAWINGS

The foregoing and other objects, aspects and advantages will be better understood from the following detailed preferred embodiment description with reference to the drawings, in which:

FIGS. 4A–B show how secure filenames are generated according to the preferred embodiment of the present invention.

DETAILED DESCRIPTION OF PREFERRED EMBODIMENTS OF THE INVENTION

Figure 1:
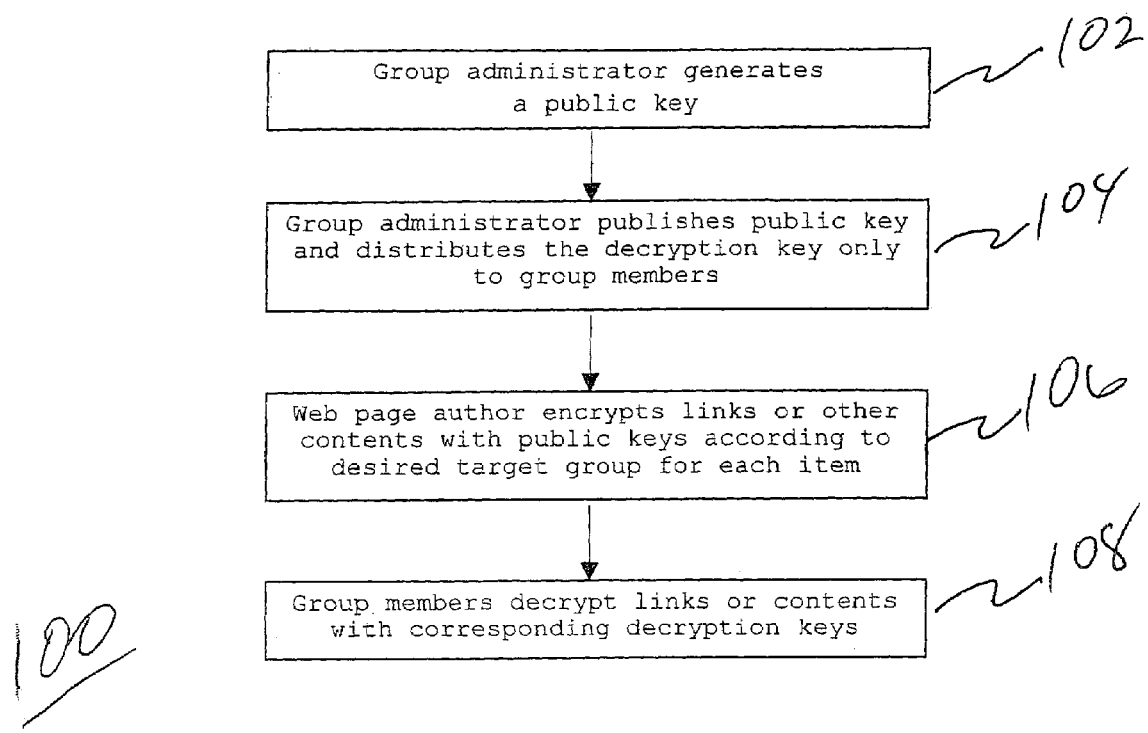
FIG. 1 shows a flow diagram of an example of the method of the present invention of selectively providing access to secure semi-private files.

Referring now to the drawings, and more particularly, FIG. 1 shows a flow diagram example 100 of the method of the present invention of selectively providing access to secure semi-private files. As referred to herein, a web-based file includes any file wherein one or more Internet or world wide web (www) related coded pages includes at least one link directed to the file. Files referred to herein as semi-private files are files intended for use only by a selected group of individuals or users. Secure semi-private files are semi-private files that are protected by some security mechanism such as password protection.

In one preferred embodiment of the present invention, the password is embedded in and part of the file's Uniform Resource Locator (URL). In a second preferred embodiment, referred to herein as Public Key Cryptography, links to secure semi-private files are accessible by group members (through a password), but are not accessible by non-group members. Thus, a party having access to a linked web page, but not having knowledge of the password, may be unaware of undisplayed links to the secure semi-private files.

So, first in step 102, a group administrator generates a public key. Then, in step 104, the group administrator publishes the public key. A public key may be posted on a web page enabling anyone to post encrypted text on the web page that only group members may decrypt. Also, the group administrator generates and distributes a decryption key only to members of a selected group. In the first preferred embodiment, the decryption key is combined with the public key to form a secure file name for a particular semi-private file. Each semi-private file is accessible only to those in possession of the decryption key.

Next, in step 106, secure file names are embedded as secure links in existing web pages or, new web pages may be built that include secure links to the semi-private files. The web page designer or builder may include secure links for multiple groups, as well as typical (unsecured) links. Links intended for access by specific groups are formed from the previously published public key in combination with decryption keys for each particular authorized group. Thus, specific items directed to specific groups may coexist on the same web page but, without any of the groups having knowledge or even being aware that other items targeted to other groups are included on the same web page. So, for each group accessing the same web page, in step 108, members of a particular group decrypt links or contents to items linked in that page depending upon that particular group having been previously granted permission, i.e., by virtue of having received private keys from the group administrator.

Figure 2:
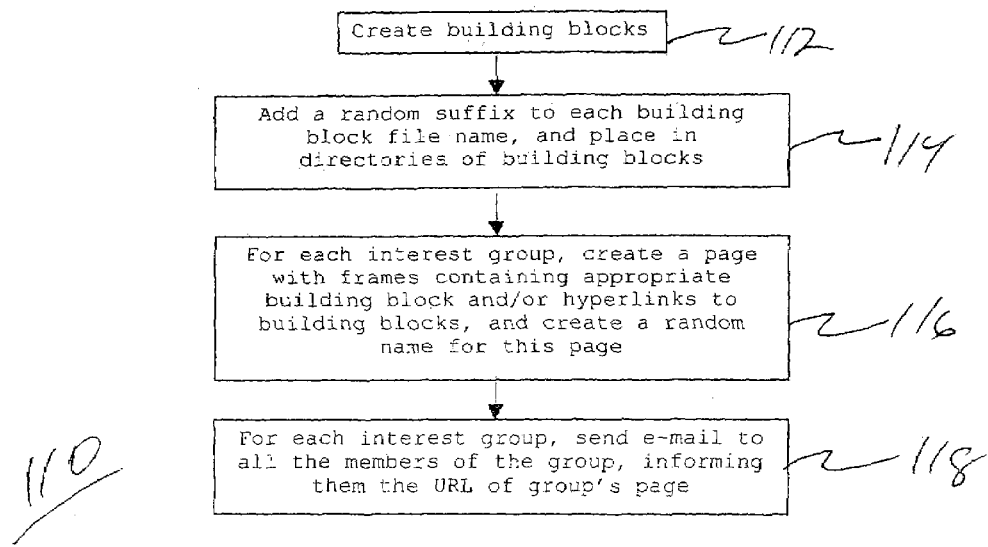
FIG. 2 is an example of a flow diagram showing how pages are created for a particular group according to preferred embodiment.

FIG. 2 is an example of a flow diagram 110 showing how pages are created for a particular group according to preferred embodiment. First in step 112, the web site designer or builder places various blocks that may be shown to different groups in a special directory of building blocks. This special block directory may have a simple or trivial name since awareness of it may be restricted to those intended to have use of it. By contrast, secure files maintained and accessible from this block directory should have names that are simultaneously both partially informative and are partially difficult to guess. So, in step 114, random suffixes are generated (to generate difficult to guess portions) and, one or more random suffix is attached to each informative name portion to form building block file names. Each newly generated file name with the attached random suffix is entered in a directory of the building blocks.

For example, a first user, user1, may place a file, index.html, in block directory, /users/user1/bldblks. Other secure files in that directory might include: poem6A5ZQRT.doc, homeaddress9GDK321.txt, map42TYU13.gif, each having an easily understood portion and a randomly generated suffix portion providing security to the secure file. The informative part of each secure filename facilitates site maintenance, making it simpler to understand the nature of the file's contents. By contrast, the randomly generated suffix portion, has a random appearance, making it unlikely that unauthorized parties could discover the actual file name, much less guess it or stumble onto it.

Once the building blocks are in place, the web page builder designs web pages that are seen only by selected groups in step 116. The web pages are created using frames, for example; the completed web pages contain appropriate building blocks and/or hyperlinks to the building blocks for each interest group. Also, at this point, a random name is created for each web page.

For example, one group (group1) may be given access to a poem (poem6A5ZQRT.doc) and a home address (homeaddress9GDK321.txt), a second group (group2) may be given access to the poem and a map (map42TYU13.gif), while a third group (group3) is given access to the home address and the map. According to the preferred embodiment of the present invention, this is effected by creating an individual page for each of the groups, group1CCWQUYT.html, group2GFDT43SD.html and group3HGOIP76R.html. Each individual page contains group specific hyperlinks to the appropriate materials or, includes group specific material embedded as frames on the particular web page. Thus, for this example, the HTML file for the first group would contain the lines for the poem and for the home address:

<A HREF="http://www.sonesite.com/users/user1/bldblks/poem6A5ZQRT.doc"> The poem</A>

.
.
.

<A HREF="http://www.sonesite.com/users/user1/bldblks/homeaddress9GDK321.txt">Home Address</A> . . . , with appropriate link implementation and files in the corresponding pages for the other two groups.

Continuing in step 118, members of the group are informed about the URL of that particular page. Preferably, this is done using e-mail although it could be done verbally or, by using any other appropriate information distribution technique. Notifying group members is necessary because the URL is partially secure, by virtue of the random portion included in the URL that will be known only to those people so informed. Thus, the owner of the block directory, e.g., user1, can e-mail the URL http://www.sonesite.com/users/user1/group 1 CCWQUYT.html to the members of group1, optionally using any well known encryption technique for added security. The URL is not made available for general distribution and, so, remains private and secure provided none of the group members discloses it, e.g., by placing a link to it on a public page or by distributing it to other non-group members. So, the web page will be viewed as any other web page, but only by those intended by the author to see it. Each group member may easily place a link in a bookmark or favorites file for repeated subsequent easy access.

Figure 3:
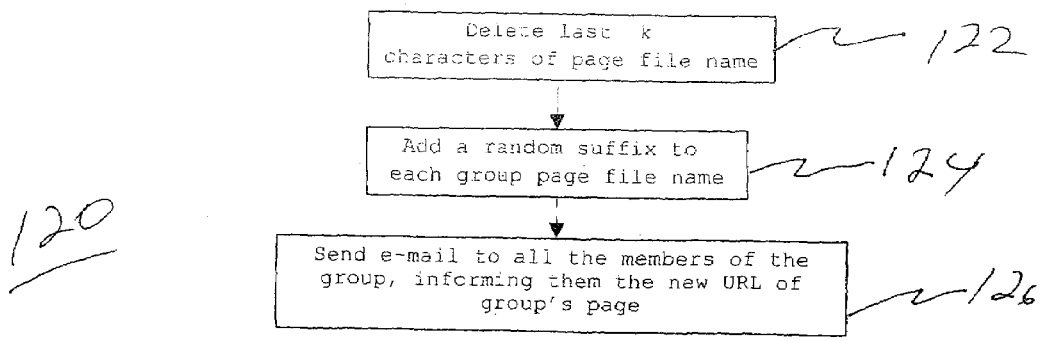
FIG. 3 is a flow diagram 120 of an example of how group page names may be changed for additional security.

FIG. 3 is a flow diagram 120 of an example of how group page names may be changed for additional security. Group page names may change, for example, to frustrate hackers or, if group members change, or for any reason a password would be changed. First, in step 122, the pseudo-random number suffix of the old secure web page URL is deleted. Thus, some or all of the random suffixes may be changed manually by the web page builder or, automatically, by the web site system of the preferred embodiment. Then, in step 124, after generating a new random suffix, i.e., after generating a new random number, the new suffix is attached to the group name to form the group page name. After each random suffix change, the affected group members are notified, either automatically by the system or by the web page builder. Notification may be, merely, a reminder that the encryption key has been changed and that group members should run a previously supplied executable that changes corresponding URLs in the group members' bookmarks files. Alternatively, that new random suffix or an updated bookmark imprinted with that random suffix may be encrypted and directly e-mailed or otherwise transmitted to group members, making group members aware of the new URLs for those pages intended for group access.

Figure 4A:
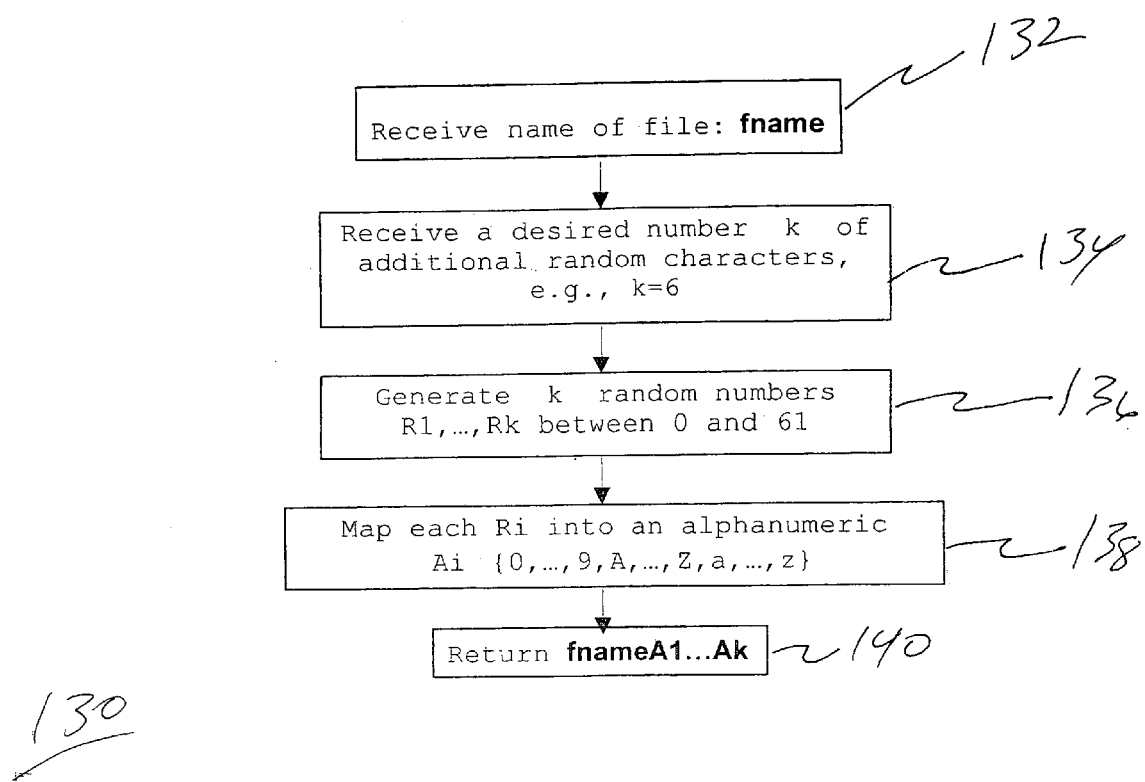

FIGS. 4A–B show how secure filenames are generated according to the preferred embodiment of the present invention. FIG. 4A is a flow diagram 130 of how secure names are generated according to the preferred embodiment of the present invention. FIG. 4B is a cross-reference table for mapping numbers from 0–61 to corresponding alphanumeric characters, wherein the random suffixes are generated using, for example, a pseudo-random number generator to generate a n-digit numerical key, wherein n is any positive integer and each digit is between 0 and 61. Thus, in step 132, after a particular group has been identified to be requesting secure web page access, the group administrator receives the name of a particular file (fname). Then, in step 134, a k-digit random suffix is generated using a psuedo random number generator for example. The random suffix may be any length, but should be long enough to be non-trivial and may be difficult to memorize and so, may be stored locally on a particular group members' computer. Preferably the random suffix length is randomly generated and is 5–8 characters long. Having decided encryption key length, in step 136, k individual random numbers between 0 and 61 are generated, each generated random number corresponding to an entry in the cross reference table of FIG. 4B. So, in step 138, using the cross-reference table of FIG. 4B, each of the k random numbers are mapped into alphanumeric characters. Finally, in step 140, the k alphanumeric character random suffix is concatenated onto the end of the file name (fname) received in step 132.

It should be noted that the present invention may be adapted to usenet newsgroups to provide private newsgroups. In this optional embodiment, a group member user can initiate discussion groups for different subjects in a way that only invited participants and group members have access to the discussion. The correspondence stream is maintained and archived on a single machine (the initiator's machine) and, only invited participants know the newsgroup directory location, e.g., its URL.

The second preferred embodiment, Public Key Cryptography, provides additional security over and above that of the first preferred embodiment. This second preferred embodiment may be implemented in addition to or, optionally, independently of the above first preferred embodiment. In this second embodiment, a web page builder creates web pages with publicly known names and the web pages include both un-encrypted links as well as encrypted links. Preferably, encryption is done using a public key-private key scheme as described in U.S. Pat. No. 4,405,829 entitled "Cryptographic Communications System and Method" to Rivest et al.

For example, a web page builder publishes a public key and distributes a private key in a secure way to each person intended to have access to particular encrypted links. A web page named http://www.somesite.com/someuser/index.html may include un-encrypted links as well as links that are encrypted using encryption keys. In the second preferred embodiment, the name of the link itself may be encrypted using the public key. Thus, links intended for a particular family may have the standard form, e.g., http://www.somesite.com/someuser/family.html or, when also including the added protection of the first preferred embodiment, having the form http://www.somesite.com/someuser/family83Edrf5.html.

Typically, for the first URL above, a plain HTML link may have the form

<A HREF="http://www.somesite.com/someuser/family.html">FAMILY STUFF</A>, published on publically known page http://www.somesite.com/someuser/index.html. However, after encryption according to the second preferred embodiment, the link in this example (or a link corresponding to the second more secure link) may become A2#3F&*(hc342FXCVBh.

For the second preferred embodiment, eXtensible Markup Language (XML) is enhanced to include secure links, adding, for example, a new XML tag, e.g., an SA tag. Thus, in this example, the web site builder includes an encrypted HTML link on the publically known web page using the SA tag, e.g., <SA HREF="A2#3F&*(hc342FXCVBh">FAMILY STUFF</SA>, which, when decrypted, points to http://www.somesite.com/someuser/family.html (or family83Edrf5.html).

As can be seen from this example, an intruder/hacker or an otherwise unauthorized visitor will not be able to select the link displayed in the SA tag. However, an authorized party, in this example a family member, who has access to the correct private key will be able to decrypt the link. This link may then be used for downloading the desired page to the authorized browser. As discussed hereinabove, an intruder/hacker will find it much more difficult to guess the latter type of link names without possessing the appropriate key. This second preferred embodiment provides an improved two-level security mechanism.

The typical state of the art web browser may be modified to include mechanisms to automatically retrieve an appropriate decryption key from the user's machine in response to encountering a link embedded within such a SA tagged field. So, when the browser detects a XML secure link tag in a page, the browser directs the user's system to the appropriate local directory to look for the decryption key, which, if found there, is used to decrypt the encrypted link name and requests the decrypted URL. While, at first glance, this automatic response may appear to be a password request, it is actually quite different. Instead, unlike password protection, the private key is never transmitted over the internet to the server. Rather, verification is at the client side only, i.e., at the location of the group member requesting access to the protected file or web page.

Optionally, whenever a group member requests an encrypted link that is enclosed within SA tags, the server may send an encrypted copy of the file to the group member's browser, where the public same encryption key that was used for encrypting the link is used once again. The browser, then, automatically decrypts the encrypted page using the locally stored public decryption key without any further intervention. This optional mechanism insures that accidental discovery or malicious discovery (e.g., by monitoring network traffic) of hidden links is not a security breach, opening access to the secure link without the appropriate decryption key.

While the invention has been described in terms of preferred embodiments, those skilled in the art will recognize that the invention can be practiced with modification within the spirit and scope of the appended claims.

What is claimed is:

1. A method of selectively making information available to groups of parties amongst a plurality of parties, said method comprising the steps of:
   a) generating at least one public key, each having a recognizable name portion;
   b) publishing said public key;
   c) generating at least one random suffix serving as a secure key;
   d) combining said secure key with said public key by concatenating ones of said random suffixes with ones of said public keys; and
   e) distributing a key corresponding to said secure key to members of a selected group.

2. A method as in claim 1, wherein in step (d) said secure key is combined with each of said plurality of public keys.

3. A method as in claim 1, wherein in the distribution step (e), each of said random suffixes is sent as its corresponding key to members of at least one selected group, at least one selected group not receiving at least one distributed key.

4. A method as in claim 3, wherein group members use said received random suffixes to access secure information.

5. A method as in claim 4, wherein the secure information is contained on a web page, each web page containing secure information being identified by one of said random suffixes.

6. A method as in claim 1, wherein the random suffixes are encryption keys and the corresponding keys are decryption keys.

7. A method as in claim 6, further comprising creating at least one secure web page, each having a secure web page name.

8. A method as in claim 7, wherein the step (e) of distributing the decryption keys to group members further comprises sending e-mail to members of the selected group, informing said members of said secure web page name.

9. A method as in claim 1, wherein the secure keys are encryption keys and the corresponding keys are decryption keys.

10. A method as in claim 9, wherein said encryption keys are combined with one or more links, said links combined with encryption keys being published as encrypted links.

11. A method as in claim 7, said method further comprising the step of:
   f) changing secure page names for a selected group.

12. A method as in claim 11, wherein the step (f) of changing secure page names comprises the steps of:
   i) removing a secure key from said secure page name;
   ii) attaching a new random suffix; and
   iii) sending e-mail to members of said selected group, informing said members of said name change.

13. A method as in claim 1, wherein the step (c) of generating the random suffix comprises the steps of:
   i) generating a plurality of random numbers; and
   ii) mapping each of said plurality of random numbers to a corresponding alphanumeric character.

14. A method as in claim 13, wherein each of said random numbers is a number between 0 and 61.

15. A method as in claim 14, wherein the mapped plurality of random numbers generated is a decryption key, the method further comprising:
   iii) deriving an encryption key from said generated decryption key.

16. A computer program product for selectively making information available to selected groups amongst a plurality of groups, said computer program product comprising a computer usable medium having computer readable program code thereon, said computer readable program code comprising:
   computer readable program code means for generating public keys;
   computer readable program code means for publishing public keys;
   computer readable program code means for generating secure keys that are random suffixes;
   computer readable program code means for combining said secure keys with said public keys by concatenating said random suffixes with ones of said plurality of public keys; and
   computer readable program code means for selectively distributing a key corresponding to each secure key to members of selected groups.

17. A computer program product as in claim 16, wherein the combining means combines said secure keys with said public keys to form secure links in a web page, and further comprising computer readable program code means for changing secure page names including:
   computer readable program code means for removing a secure key from said secure page name;
   computer readable program code means for attaching a new secure key; and
   computer readable program code means for sending e-mail to members of said selected groups, informing said members of said secure name change.

18. A computer program product as in claim 16, wherein each said secure key is distributed as its corresponding key and the key distribution means comprises:
   computer readable program code means for sending each of said secure keys to members of selected ones of said groups, members of at least one said group not being sent at least one distributed key.

19. A computer program product as in claim 16, further comprising:
   computer readable program code means for providing access to secure information responsive to keys provided by group members.

20. A computer program product as in claim 19, wherein the computer readable program code means for providing access to secure information further comprises:

computer readable program code means for displaying secure information on a secure web page, each web page containing secure information identified by one of said random suffixes.

21. A computer program product as in claim 19, wherein the computer readable program code means for combining the random suffixes with the public keys comprises:

computer readable program code means for creating a plurality of building blocks;

computer readable program code means for attaching a secure key to each of said plurality of building blocks to form secure building blocks; and computer readable program code means for creating one or more secure web pages, each secure web page including at least one secure building block and having a secure web page name.

22. A computer program product as in claim 21, wherein the computer readable program code means for selectively distributing the secure keys comprises:

computer readable program code means for sending e-mail to group members and informing said members of said secure web page name.

23. A computer program product as in claim 22, wherein the computer readable program code means for generating secure keys generates encryption keys and the distributed corresponding keys are decryption keys.

24. A computer program product as in claim 16, wherein the computer readable program code means for generating random suffixes comprises:

computer readable program code means for generating a plurality of random numbers between 0 and 61; and computer readable program code means for mapping each of said plurality of random numbers to a corresponding alphanumeric number.

25. A computer program product as in claim 24, wherein the mapped plurality of random numbers generated is a decryption key, the computer readable program code means for generating random suffixes further comprising:

computer readable program code means for deriving an encryption key from said generated decryption key.

* * * * *